US010865085B1

(12) United States Patent
Neff et al.

(10) Patent No.: US 10,865,085 B1
(45) Date of Patent: Dec. 15, 2020

(54) METHODS AND APPARATUS FOR APPLYING A THREADED CAP USING A LINEAR ROTARY ACTUATOR

(71) Applicant: Systems, Machines, Automation Components Corporation, Carlsbad, CA (US)

(72) Inventors: Edward A. Neff, Cardiff-by-the-Sea, CA (US); Michael A. Ferris, Murrieta, CA (US); Steve Curtiss, Grand Rapids, MI (US); Stavros Haidos, Chicago, IL (US)

(73) Assignee: Systems, Machines, Automation Components Corporation, Carlsbad, CA (US)

( * ) Notice: Subject to any disclaimer, the term of this patent is extended or adjusted under 35 U.S.C. 154(b) by 358 days.

(21) Appl. No.: 15/484,011

(22) Filed: Apr. 10, 2017

Related U.S. Application Data

(60) Provisional application No. 62/320,392, filed on Apr. 8, 2016.

(51) Int. Cl.
    B67B 3/20 (2006.01)
(52) U.S. Cl.
    CPC .............. B67B 3/204 (2013.01); B67B 3/208 (2013.01)
(58) Field of Classification Search
    CPC ........... B67B 3/204; B67B 3/261; B67B 3/20; B67B 3/208; B67B 3/264; B67B 3/2026; B65B 7/2835
    See application file for complete search history.

(56) References Cited

U.S. PATENT DOCUMENTS

| 3,602,749 | A |   | 8/1971  | Esters |
|-----------|---|---|---------|--------|
| 3,734,332 | A | * | 5/1973  | Grulich ................ B65D 50/063 |
|           |   |   |         | 215/208 |
| 4,488,242 | A |   | 12/1984 | Tabata et al. |
| 4,576,421 | A |   | 3/1986  | Teramachi |
| 4,616,886 | A |   | 10/1986 | Teramachi |
| 4,693,676 | A |   | 9/1987  | Inaba |
| 4,696,144 | A |   | 9/1987  | Bankuty et al. |
| 4,745,589 | A |   | 5/1988  | Nomura |

(Continued)

FOREIGN PATENT DOCUMENTS

| DE | 2217958 A1 | 10/1973 |
| EP | 0556469 A1 | 8/1993 |

(Continued)

OTHER PUBLICATIONS

International Search Report for International Application No. PCT/US2013/047727, dated Oct. 16, 2013, 3 pages.

(Continued)

*Primary Examiner* — Andrew M Tecco
*Assistant Examiner* — Nicholas E Igbokwe
(74) *Attorney, Agent, or Firm* — Cooley LLP

(57) ABSTRACT

A system and method for precisely applying threaded caps using a linear rotary actuator is provided. The method includes aligning the threaded cap with the threaded top of a container, soft landing the threaded cap in contact with the threaded top, aligning the ends of the threads, soft landing the threaded cap in contact with the threaded top, and snugging the threaded cap. The system includes a linear rotary actuator and a tool for driving and coupling to the threaded cap.

13 Claims, 12 Drawing Sheets

(56) References Cited

U.S. PATENT DOCUMENTS

| | | | |
|---|---|---|---|
| 4,799,803 A | 1/1989 | Tanaka | |
| 4,804,913 A | 2/1989 | Shimizu et al. | |
| 4,808,955 A | 2/1989 | Godkin et al. | |
| 4,857,786 A | 8/1989 | Nihei et al. | |
| 4,858,452 A | 8/1989 | Ibrahim | |
| 5,051,635 A | 9/1991 | Kasahara | |
| 5,053,670 A | 10/1991 | Kosugi | |
| 5,111,088 A | 5/1992 | Fujino | |
| 5,115,617 A * | 5/1992 | Lewis | B65B 7/2835 53/306 |
| 5,160,865 A | 11/1992 | Gururangan | |
| 5,161,586 A | 11/1992 | Auriemma | |
| 5,175,456 A | 12/1992 | Neff et al. | |
| 5,201,838 A | 4/1993 | Roudaut | |
| 5,212,862 A | 5/1993 | Eshghy | |
| 5,225,725 A | 7/1993 | Shiraki et al. | |
| 5,270,625 A | 12/1993 | Neff | |
| 5,317,222 A | 5/1994 | Neff et al. | |
| 5,376,862 A | 12/1994 | Stevens | |
| 5,446,323 A * | 8/1995 | Neff | H02K 41/0356 29/834 |
| 5,450,050 A | 9/1995 | Ban et al. | |
| 5,476,324 A | 12/1995 | Takei | |
| 5,501,498 A | 3/1996 | Ulrich | |
| 5,594,309 A | 1/1997 | McConnell et al. | |
| 5,685,214 A | 11/1997 | Neff et al. | |
| 5,722,300 A | 3/1998 | Burkhard et al. | |
| 5,751,075 A | 5/1998 | Kwon et al. | |
| 5,834,872 A | 11/1998 | Lamb | |
| 5,859,482 A | 1/1999 | Crowell et al. | |
| 5,893,646 A | 4/1999 | Mizutani et al. | |
| 5,952,589 A * | 9/1999 | Leung | G01B 7/002 33/558 |
| 6,021,555 A * | 2/2000 | Leong | B23P 19/066 29/407.02 |
| 6,043,573 A | 3/2000 | Neff et al. | |
| 6,073,505 A | 6/2000 | Yuda | |
| 6,091,167 A | 7/2000 | Vu et al. | |
| 6,105,343 A * | 8/2000 | Grove | B65B 7/2835 53/490 |
| 6,116,139 A | 9/2000 | Yuda et al. | |
| 6,118,360 A | 9/2000 | Neff | |
| 6,223,971 B1 | 5/2001 | Sato | |
| 6,290,308 B1 | 9/2001 | Zitzelsberger | |
| 6,439,103 B1 | 8/2002 | Miller | |
| 6,495,935 B1 | 12/2002 | Mishler | |
| 6,741,151 B1 | 5/2004 | Livshitz et al. | |
| 6,792,657 B2 | 9/2004 | Reid et al. | |
| 6,848,164 B2 | 2/2005 | Jung | |
| 6,907,651 B1 | 6/2005 | Fisher et al. | |
| 6,997,077 B2 | 2/2006 | Kollmann et al. | |
| 7,011,117 B1 | 3/2006 | Carpino et al. | |
| 7,053,583 B1 | 5/2006 | Hazelton | |
| 7,168,748 B2 | 1/2007 | Townsend et al. | |
| 7,323,798 B2 | 1/2008 | Hartramph et al. | |
| 7,482,717 B2 | 1/2009 | Hochhalter et al. | |
| 7,517,721 B2 | 4/2009 | Ito et al. | |
| 8,083,278 B2 | 12/2011 | Yuan | |
| 8,415,838 B1 | 4/2013 | Eghbal et al. | |
| 8,498,741 B2 | 7/2013 | Ihrke et al. | |
| 8,578,760 B2 | 11/2013 | Calhoun et al. | |
| 8,915,047 B2 * | 12/2014 | Wilhelm | B67B 3/12 53/300 |
| 9,375,848 B2 | 6/2016 | Neff et al. | |
| 9,381,649 B2 | 7/2016 | Neff et al. | |
| 9,731,418 B2 | 8/2017 | Neff et al. | |
| 9,748,823 B2 | 8/2017 | Neff et al. | |
| 9,748,824 B2 | 8/2017 | Neff et al. | |
| 2002/0148205 A1 * | 10/2002 | Takebe | B67B 3/20 53/490 |
| 2002/0166221 A1 | 11/2002 | Clew | |
| 2003/0009241 A1 | 1/2003 | Kruger et al. | |
| 2003/0218391 A1 | 11/2003 | Hirata | |
| 2004/0076348 A1 | 4/2004 | Dalessandro et al. | |
| 2004/0227535 A1 | 11/2004 | Kobayashi et al. | |
| 2004/0232800 A1 | 11/2004 | Seguchi et al. | |
| 2005/0211512 A1 | 9/2005 | Fenwick | |
| 2005/0234565 A1 | 10/2005 | Marks et al. | |
| 2005/0253469 A1 | 11/2005 | Hochhalter et al. | |
| 2006/0023980 A1 | 2/2006 | Kato et al. | |
| 2006/0113847 A1 | 6/2006 | Randall et al. | |
| 2006/0242929 A1 * | 11/2006 | Servadei | B67B 3/208 53/490 |
| 2008/0048505 A1 | 2/2008 | Moriyama et al. | |
| 2008/0150559 A1 | 6/2008 | Nayak et al. | |
| 2008/0157607 A1 | 7/2008 | Scheich et al. | |
| 2008/0258654 A1 | 10/2008 | Neff | |
| 2009/0013642 A1 * | 1/2009 | Yuyama | B65B 7/2835 53/308 |
| 2009/0040247 A1 | 2/2009 | Cato et al. | |
| 2009/0058198 A1 | 3/2009 | Finkbeiner et al. | |
| 2009/0058201 A1 | 3/2009 | Brennvall | |
| 2009/0058581 A1 | 3/2009 | Neff et al. | |
| 2009/0114052 A1 | 5/2009 | Haniya et al. | |
| 2009/0152960 A1 | 6/2009 | Kimura et al. | |
| 2009/0218894 A1 | 9/2009 | Aso et al. | |
| 2009/0261663 A1 | 10/2009 | Aso et al. | |
| 2009/0278412 A1 | 11/2009 | Kimura et al. | |
| 2009/0302798 A1 | 12/2009 | Wei | |
| 2009/0309442 A1 | 12/2009 | Qu et al. | |
| 2010/0005918 A1 | 1/2010 | Mizuno et al. | |
| 2010/0101192 A1 * | 4/2010 | Krevald | B65B 7/2835 53/490 |
| 2010/0133924 A1 | 6/2010 | Neff et al. | |
| 2010/0171378 A1 | 7/2010 | Kim et al. | |
| 2010/0203249 A1 | 8/2010 | Elgimiabi | |
| 2010/0244605 A1 | 9/2010 | Nakano et al. | |
| 2010/0274365 A1 | 10/2010 | Evans et al. | |
| 2011/0068595 A1 | 3/2011 | Ihrke et al. | |
| 2011/0083405 A1 * | 4/2011 | Dewert | B67B 3/20 53/490 |
| 2011/0187222 A1 | 8/2011 | Li et al. | |
| 2012/0043832 A1 | 2/2012 | Neff et al. | |
| 2012/0080960 A1 | 4/2012 | Neff et al. | |
| 2012/0206024 A1 | 8/2012 | Yoshida et al. | |
| 2012/0299405 A1 | 11/2012 | Li et al. | |
| 2012/0305092 A1 | 12/2012 | Corso et al. | |
| 2013/0154397 A1 | 6/2013 | Sullivan | |
| 2014/0159407 A1 | 6/2014 | Neff et al. | |
| 2014/0159408 A1 | 6/2014 | Neff et al. | |
| 2014/0159513 A1 | 6/2014 | Neff et al. | |
| 2014/0159514 A1 | 6/2014 | Neff et al. | |
| 2014/0210396 A1 | 7/2014 | Yamanaka et al. | |
| 2014/0317941 A1 | 10/2014 | Patti et al. | |
| 2015/0168483 A1 | 6/2015 | Kim | |
| 2015/0171723 A1 | 6/2015 | Neff et al. | |
| 2015/0303785 A1 | 10/2015 | Neff et al. | |
| 2016/0013712 A1 | 1/2016 | Neff et al. | |
| 2016/0184989 A1 | 6/2016 | Neff et al. | |
| 2016/0229064 A1 | 8/2016 | Neff et al. | |
| 2017/0012519 A1 | 1/2017 | Neff et al. | |
| 2017/0014964 A1 | 1/2017 | Neff | |
| 2017/0089976 A1 | 3/2017 | Neff et al. | |

FOREIGN PATENT DOCUMENTS

| | | |
|---|---|---|
| EP | 1278109 | 1/2003 |
| EP | 1827073 | 8/2007 |
| GB | 645281 A | 10/1950 |
| JP | 61-116964 A2 | 6/1986 |
| JP | 04-181562 | 6/1992 |
| JP | 03285554 A | 12/1992 |
| JP | 06-260332 | 9/1994 |
| JP | 07-015942 | 1/1995 |
| JP | 07-131967 A | 5/1995 |
| JP | H09-214187 | 8/1997 |
| JP | 2000-152592 A | 5/2000 |
| JP | 2001-238427 A | 8/2001 |
| JP | 2001-286121 A2 | 10/2001 |
| JP | 2002-176292 | 6/2002 |
| JP | 2004-332935 | 11/2004 |
| JP | 2005-020901 A | 1/2005 |

(56) References Cited

FOREIGN PATENT DOCUMENTS

| JP | 2005-080415 | | 3/2005 |
|---|---|---|---|
| JP | 2008-048556 | A | 2/2008 |
| JP | 2008-155302 | A2 | 7/2008 |
| JP | 2008-193845 | A2 | 8/2008 |
| JP | 2010-178614 | A | 8/2010 |
| KR | 10-2008-0090040 | | 10/2008 |
| KR | 20-2011-0003488 | | 4/2011 |
| KR | 10-2011-0139434 | | 12/2011 |
| WO | WO 2007/026566 | A1 | 3/2007 |
| WO | WO 2007/063729 | A1 | 6/2007 |
| WO | WO 2009/116343 | A1 | 9/2009 |
| WO | WO 2009/117827 | | 10/2009 |
| WO | WO 2011/088964 | A1 | 7/2011 |
| WO | WO 2014/076809 | | 5/2014 |
| WO | WO 2015/117095 | | 8/2015 |
| WO | WO 2015/154026 | | 10/2015 |

OTHER PUBLICATIONS

Written Opinion for International Application No. PCT/US2013/047727, dated Oct. 16, 2013, 4 pages.
International Preliminary Report on Patentability for International Application No. PCT/US2013/047727, dated Dec. 31, 2014, 5 pages.
International Search Report for International Application No. PCT/US2013/047728, dated Oct. 16, 2013, 3 pages.
Written Opinion for International Application No. PCT/US2013/047728, dated Oct. 16, 2013, 6 pages.
International Preliminary Report on Patentability for International Application No. PCT/US2013/047728, dated Dec. 31, 2014, 7 pages.
International Search Report and Written Opinion for International Application No. PCT/US2008/071988, dated Nov. 3, 2008, 5 pages.
International Preliminary Report on Patentability for International Application No. PCT/US2008/071988, dated Feb. 2, 2010, 5 pages.
International Search Report and Written Opinion for International Application No. PCT/US2008/052121, dated Aug. 6, 2008, 5 pages.
International Preliminary Report on Patentability for International Application No. PCT/US2008/052121, dated Jul. 28, 2009, 5 pages.
International Search Report and Written Opinion for International Application No. PCT/US2011/053070, dated Feb. 16, 2012, 6 pages.
International Preliminary Report on Patentability International Application No. PCT/US2011/053070, dated Mar. 26, 2013, 5 pages.
Supplementary European Search Report for European Application No. 14191347.5, dated May 4, 2015, 7 pages.
International Search Report and Written Opinion for International Application No. PCT/US2015/014133, dated Apr. 29, 2015, 8 pages.
International Search Report and Written Opinion for International Application No. PCT/US2015/024341, dated Jul. 15, 2015, 10 pages.
International Preliminary Report on Patentability for International Application No. PCT/US2015/024341, dated Oct. 4, 2016, 8 pages.
International Search Report and Written Opinion for International Application No. PCT/US2015/054314, dated Jan. 22, 2016, 10 pages.
International Search Report and Written Opinion for International Application No. PCT/US2016/014602, dated May 12, 2016, 9 pages.
International Search Report and Written Opinion for International Application No. PCT/US2016/041793, dated Oct. 3, 2016, 7 pages.
International Search Report and Written Opinion for International Application No. PCT/US2016/053565, dated Dec. 27, 2016, 8 pages.
Dirjish, M., "What's the difference between brush DC and brushless DC motors?", Electronic Design, Feb. 16, 2012, 5 pages.
Semiconductor Components Industries, LLC, "DC Motor Driver Fundamentals," Publication Order No. TND6041/D, ON Semiconductor [online], Mar. 2014—Rev. 1, pp. 1-9, www.onsemi.com.
Machine Design, Design FAQs, Variable Wattage Control Systems for Electric Heaters, "Moving coil motor technology," [online], Feb. 26, 2009, [Retrieved from the Internet: Jul. 31, 2015], <URL: http://machinedesign.com/motion-control/moving-coil-motor-technology>, 1 page.
Thomas Publishing Company, Product News: Mechanical Power Transmission, "Actuator and Ball Spline come in mini and micro sizes," [online], Sep. 3, 2004, [Retrieved from the Internet: Aug. 7, 2015], <URL: http://news.thomasnet.com/fullstory/455177>, 5 pages.
Luna Bearings, Automation & Power Transmission, WON Linear Motion System, "Compact Ball Spline," [online], 2009, [Retrieved from the Internet: Aug. 7, 2015], <URL: http://www.lunabearings.com/won.htm>, 6 pages.

* cited by examiner

METHODS AND APPARATUS FOR APPLYING A THREADED CAP USING A LINEAR ROTARY ACTUATOR

CROSS-REFERENCE TO RELATED APPLICATIONS

The present application claims the benefit of priority under 35 U.S.C. § 119(e) of U.S. Provisional Application No. 62/320,392, entitled METHODS AND APPARATUS FOR APPLYING A THREADED CAP USING A LINEAR ROTARY ACTUATOR, filed Apr. 8, 2016, the content of which is hereby incorporated by reference in its entirety for all purposes.

FIELD

The present disclosure pertains generally to machines which are useful for automated bottling. More particularly, the present disclosure pertains to methods and apparatus for repeatedly applying threaded caps during automated bottling or filling of a product container.

BACKGROUND

Quality and process throughput are important in the packaging of products using an automated assembly process. Often, liquid or gel products are packaged in high volumes using automated equipment. Automated machines utilize actuators to cap bottles, jars, tubs, and jugs. For example, bottling lines operate at high-speeds to cap bottles using actuators in multiple axes to pick-up caps and precisely place them on the bottles.

Linear actuators are mechanical devices which are used to perform repetitive actions requiring linear motion. For example, linear actuators can be used in an assembly plant for placing items in trays, for automatically stamping or labeling mail, for glass cutting, for placing chips on circuits, for testing various buttons or touch areas on electronic devices, for automation, and for a wide variety of other purposes as well. Other examples include using actuators to attach a circuit board to a chassis using a plurality of screws. The actuator picks up each screw and inserts it into a threaded fastener to secure the circuit board.

Rotary actuators are mechanical devices which are used to perform repetitive actions requiring rotational or rotary motion. For example, rotary actuators can be used in an assembly plant for placing items in trays, for actuating valves, for glass cutting, for placing chips on circuits, for testing various buttons or touch areas on electronic devices, for remote actuation, and for a wide variety of other purposes as well.

Linear rotary actuators are mechanical devices which are incorporate both linear and rotary motion within a single actuator.

Threaded caps are frequently used for packaging various products. For example, threaded caps like lids are used to removably enclose foods, chemicals, beverages, and water.

When considering the operation of a machine that is to be used for the purpose of packaging consumer goods, the consequences of the manufacturing process on the end product, as well as process throughput, needs to be addressed. In some instances, increased process throughput can be achieved by increasing the speed of the actuator; however, this can result in reduced quality and increased failures due to the cap contacting the top of the product container with greater speed and force. For example, a machine can be used for capping a product that first picks up a threaded cap and second places it, for example, onto contact with a threaded top of the product container. Because the machine operates to move a first body (the tool with the threaded cap) onto contact with a second body (the threaded top), forces are generated against both bodies by this action. The can result in the threads of the cap and the top of the product container being damaged. Known precise operations for avoiding thread damage are often slow and result in decreased process throughput.

SUMMARY

Systems and methods for repeatedly applying threaded caps during automated packaging of a product in a precise and controlled manner while minimizing impact forces and damage are disclosed.

In one aspect the disclosure describes a system and method for precisely applying threaded caps using a linear rotary actuator. The method includes applying a threaded cap onto a threaded top of a container. An actuator including a tool for engaging the threaded cap is provided. The threaded cap is coupled to the tool. The axes of the threaded cap and the threaded top are aligned. In one implementation the actuator linearly actuates to move the threaded cap along the threaded top axis into an approach position. The actuator linearly actuates to move the threaded cap from the approach position and into contact with the threaded top using a soft land procedure. The actuator rotatively actuates in a counter-clockwise direction to align a threaded-cap thread end with a threaded-top thread end. The actuator rotatively actuates in a clockwise direction to drive the first threaded cap onto the first threaded top.

The method may further include applying a reduced torque to the threaded cap to snug the threaded cap on the threaded top and applying a final torque to the threaded cap to achieve a final torque specification for the threaded cap on the threaded top. The method optionally includes rotatively actuating the actuator in a counter-clockwise direction to loosen the threaded cap prior to applying a final torque by rotatively actuating the actuator in a clockwise direction.

In another aspect the disclosure is directed to a method for applying a threaded cap onto a threaded top of a container using an actuator configured with a tool. The method includes coupling the threaded cap to the tool, the threaded cap having a clockwise thread about a threaded cap axis. The method further includes aligning the threaded cap axis with a threaded top axis of the threaded top. The actuator is linearly actuated to move the threaded cap along the threaded top axis into contact with the threaded top. The actuator may be rotatively actuated in a counter-clockwise direction to align a thread end of the threaded cap with a thread end of the threaded top and rotatively actuated in a clockwise direction to drive the threaded cap onto the threaded top.

The following U.S. published applications are hereby incorporated herein by reference for all purposes:

Application Ser. No. 13/927,075 Application Date Jun. 25, 2013 Publication No. US-2014-0159407-A1 Publication Date Jun. 12, 2014 Title ROBOTIC FINGER Application Ser. No. 13/927,076 Application Date Jun. 25, 2013 Publication No. US-2014-0159408-A1 Publication Date Jun. 12, 2014 Title ROBOTIC FINGER Application No. PCT/US2013/047727 Application Date Jun. 25, 2013 Publication No. WO 2014/004588 Publication Date Jan. 3, 2014 Title ROBOTIC FINGER Application Ser. No. 13/927,079 Application Date Jun. 25, 2013 Publication No. US-2014-0159514-A1 Publication Date Jun. 12, 2014 Title LOW-COST, REDUCED DIAMETER LINEAR ACTUATOR Application Ser. No. 13/927,078 Application Date Jun. 25, 2013 Publication No. US-2014-0159513-A1 Publication Date Jun. 12, 2014 Title LOW-COST, REDUCED DIAMETER LINEAR ACTUATOR Application No. PCT/US2013/047728 Application Date Jun. 25, 2013 Publication No. WO 2014/004589 Publication Date Jan. 3, 2014 Title LOW-COST, REDUCED DIAMETER LINEAR ACTUATOR Application Ser. No. 12/184,918 Application Date Aug. 1, 2008 Publication No. US 2009-0058581 A1 Publication Date Mar. 5, 2009 Title COMPACT LINEAR ACTUATOR AND METHOD OF MAKING SAME Application No. PCT/US2008/071988 Application Date Aug. 1, 2008 Publication No. WO 2009/018540 Publication Date Feb. 5, 2009 Title COMPACT LINEAR ACTUATOR AND METHOD OF MAKING SAME Application Ser. No. 12/020,466 Application Date Jan. 25, 2008 Publication No. US 2008-0258654 A1 Publication Date Oct. 23, 2008 Title COMBINATION PNEUMATIC AND ELECTRIC LINEAR ACTUATOR Application No. PCT/US2008/052121 Application Date Jan. 25, 2008 Publication No. WO 2008/092124 Publication Date Jul. 31, 2008 Title COMBINATION PNEUMATIC AND ELECTRIC LINEAR ACTUATOR Application Ser. No. 12/188,111 Application Date Aug. 7, 2008 Publication No. US 2009-0040247 A1 Publication Date Feb. 12, 2009 Title MICRO SHIM FOR MOVING COIL ACTUATOR Application Ser. No. 12/622,372 Application Date Nov. 19, 2009 Publication No. US 2010-0133924 A1 Publication Date Jun. 3, 2010 Title COMPACT LINEAR ACTUATOR AND METHOD OF MAKING SAME Application Ser. No. 12/860,809 Application Date Aug. 20, 2010 Publication No. US 2012-0043832 A1 Publication Date Feb. 23, 2012 Title COMPACT LINEAR ACTUATOR WITH ROTARY MECHANISM Application Ser. No. 13/244,156 Application Date Sep. 23, 2011 Publication No. US 2012-0080960 A1 Publication Date Apr. 5, 2012 Title LOW COST MULTI-COIL LINEAR ACTUATOR Application No. PCT/US2011/053070 Application Date Sep. 23, 2011 Publication No. WO 2012/040620 Publication Date Mar. 29, 2012 Title LOW COST MULTI-COIL LINEAR ACTUATOR Application Ser. No. 14/523,418 Application Date Oct. 24, 2014 Publication No US-2015-0171723-A1 Publication Date Jun. 18, 2015 Title APPARATUS AND METHODS FOR LOW COST LINEAR ACTUATOR Application Ser. No. 14/611,113 Application Date Jan. 30, 2015 Publication No US-2015-0303785-A1 Publication Date Oct. 22, 2015 Title DIRECT DRIVE MOTOR FOR ROBOTIC FINGER Application No. PCT/US2015/014133 Application Date Feb. 2, 2015 Publication No WO 2015/117095 Publication Date Aug. 6, 2015 Title DIRECT DRIVE MOTOR FOR ROBOTIC FINGER Application Ser. No. 14/678,717 Application Date Apr. 3, 2015 Publication No US-2016/0013712-A1 Publication Date Jan. 14, 2016 Title METHODS AND APPARATUS FOR COMPACT SERIES LINEAR ACTUATORS Application No. PCT/US2015/024341 Application Date Apr. 3, 2015 Publication No WO 2015/154026 Publication Date Oct. 8, 2015 Title METHODS AND APPARATUS FOR COMPACT SERIES LINEAR ACTUATORS It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

Figure 1:
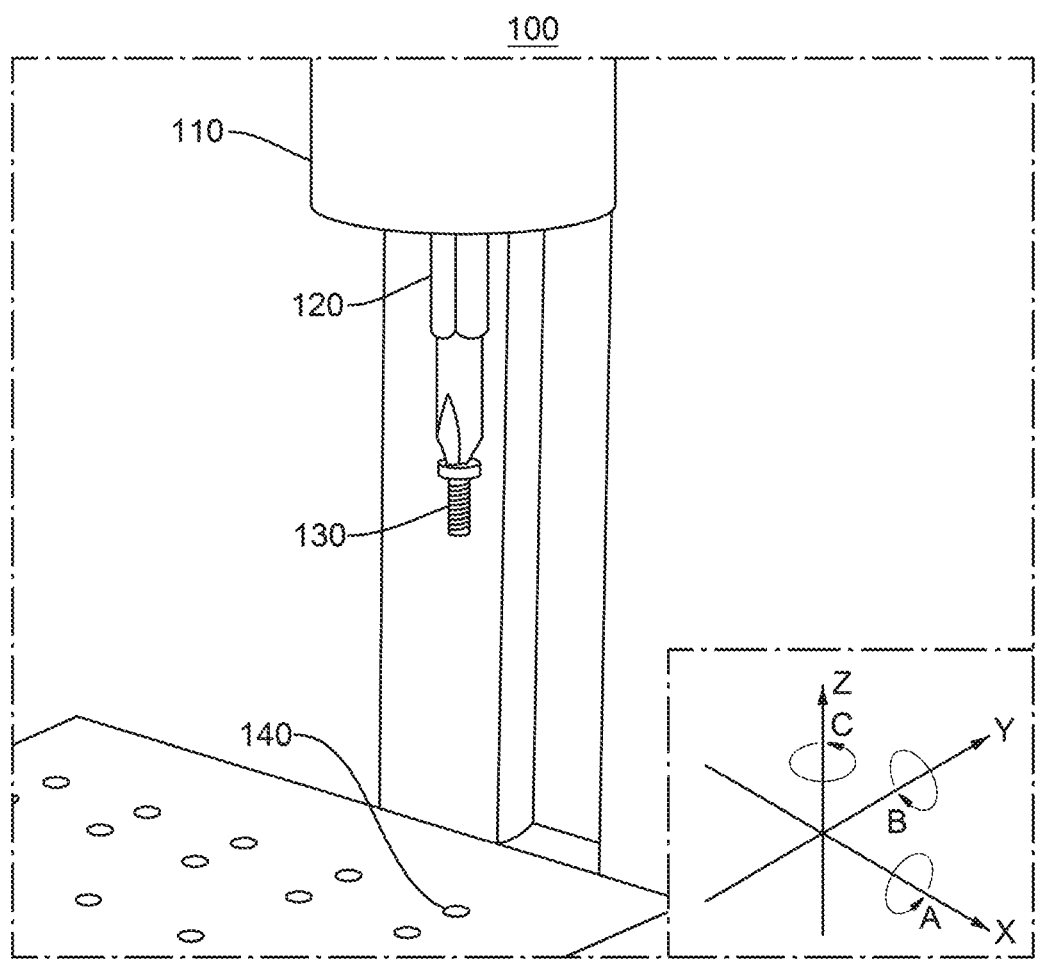
FIG. 1 shows an exemplary linear rotary actuator with a tool and threaded cap above a threaded top of a container according to an embodiment of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Following below are more detailed descriptions of various concepts related to, and embodiments of, inventive systems, methods, and apparatus for applying a threaded cap with a linear rotary actuator. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

FIG. 1 shows a portion of an exemplary linear rotary actuator 110 according to an embodiment of the present invention. The linear rotary actuator 110 can be any actuator based device, such as a pneumatic, hydraulic or electrical actuator. In preferred embodiments, the linear rotary actuator 110 is an electrical actuator, such as a moving coil actuator (also known as a voice coil actuator) or a moving magnet actuator. In one embodiment, the linear rotary actuator includes position sensors to measure an absolute or a relative position along X, Y, and Z axes, and along A, B, and C rotational axes. In one embodiment, the linear rotary actuator includes force/torque sensors to measure a force applied along X, Y, and Z axes, and to measure a torque applied along A, B, and C rotational axes. The position and force/torque sensors provide real time data to a controller that interfaces with the linear rotary actuator. The distance traveled, the total number of turns, and the applied force can be measured using the sensors and can be recorded by the controller. The controller can determine, based upon a feedback signal from a torque sensor associated with the actuator, that at least one of a threaded cap and a threaded top are impaired. For example, the controller can detect stripped caps, stripped container tops, or other impairments in the threading of caps and tops based on sensor feedback. In one particular case, the feedback signal(s) from one or more torque sensor(s) may indicate a minimum torque condition exists after a threaded cap has been rotated a number of turns typically required to seal a container. In this case the controller can send a signal alerting an operator that the container is not properly sealed.

Referring FIG. 1, the system 100 includes a linear rotary actuator 110 and a tool 120. It is understood that although one linear rotary actuator 110 is shown, the system 100 can be configured to include more than one linear rotary actuator and more than one tool. The tool 120 engages and is temporarily coupled to a threaded cap 130. In one embodiment, the tool is magnetized to magnetically couple with a ferrous threaded cap. The tool can be permanently magnetized or can include an electromagnet to attract the ferrous threaded cap. In one embodiment, the tool includes a vacuum chuck which develops a suction to couple with a threaded cap. In one embodiment, the tool mechanically interferes with the threaded cap to temporarily couple the tool to the threaded cap. In one embodiment, the tool includes a clamp that grabs the threaded cap.

The tool 120 engages with the threaded cap 130 to drive the threaded cap 130 onto a threaded top 140. The tool 120 also engages with the threaded cap 130 to remove the threaded cap 130 from a threaded top 140. In one embodiment, the tool includes an inner pattern that matches the periphery of the threaded cap. In some embodiments, the tool acts as a socket to engage with a matching pattern on the threaded cap.

In one embodiment, the linear rotary actuator 110 moves along the X-Y axes to align an axis of the threaded cap 130 with the axis of the threaded top 140. In one embodiment, the linear rotary actuator 110 moves in X-Y directions, as well as rotates about each of the X and Y axes as shown by arrows A and B to align an axis of the threaded cap 130 with the axis of the threaded top 140. In one embodiment, the linear rotary actuator 110 is in a fixed X-Y position and the threaded top 140 is moved in X-Y directions to align an axis of the threaded cap 130 with the axis of the threaded top 140. In one embodiment, the linear rotary actuator 110 is in a fixed X-Y position and the threaded top 140 is moved in X-Y directions, as well as rotated about each of the X and Y axes (as shown by arrows A and B), in order to align an axis of the threaded cap 130 with the axis of the threaded top 140. In one embodiment, the linear rotary actuator 110 is in a fixed X-Y position and the threaded top 140 is moved on a conveyor to a position underneath the threaded cap 130.

Figure 2:
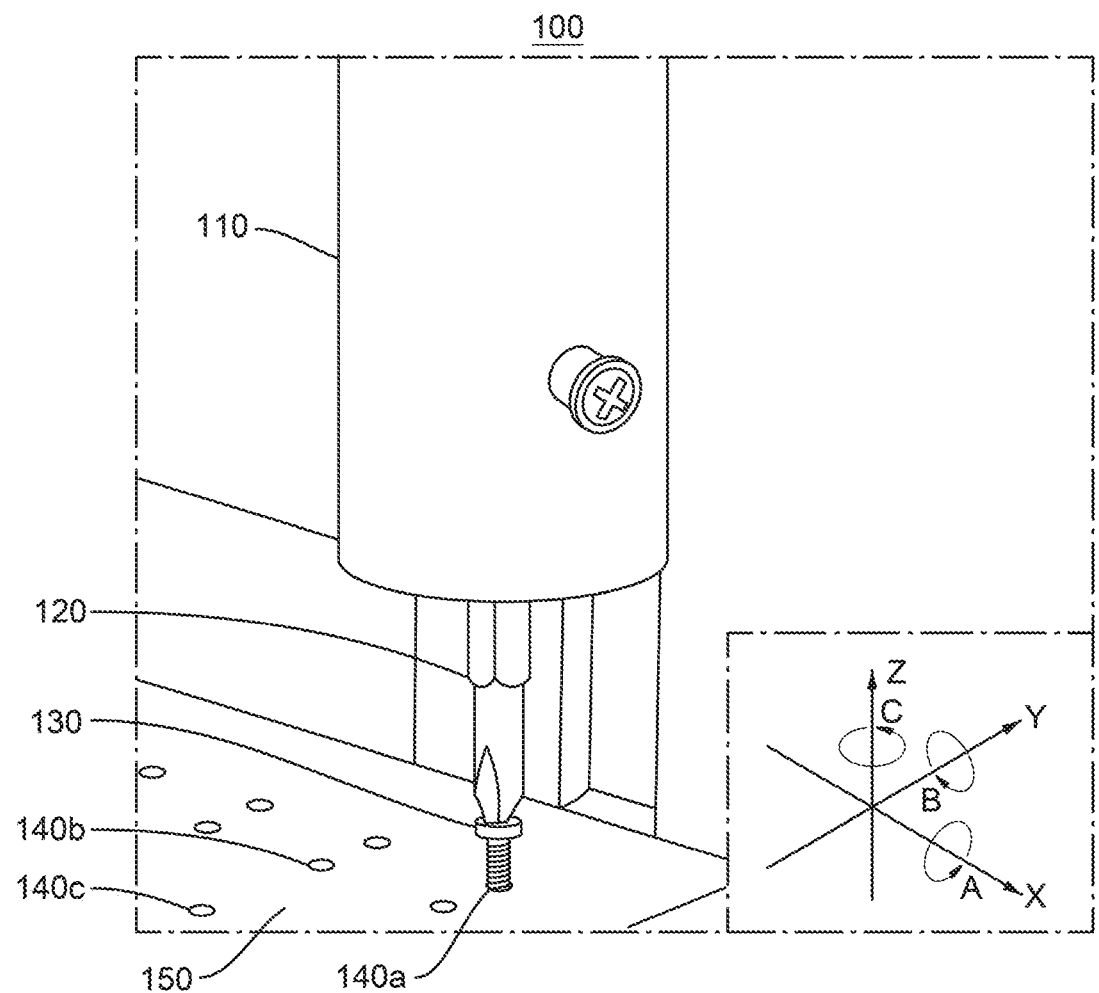
FIG. 2 shows an exemplary linear rotary actuator and a threaded cap contacting a threaded top of a container according to an embodiment of the present invention.

FIG. 2 shows a portion of a linear rotary actuator 110 that has moved in a linear Z direction to contact the threaded cap 130 with the top of the threaded top 140. The linear rotary actuator 110 can include one or more encoders (not shown) that are capable of taking positional/rotational measurements about and along one or more axes. That is, in response to control signals from the controller (not shown), the linear rotary actuator 110 sends measurements from its encoders to a controller to indicate the precise positional location of the threaded cap 130 about and along the relevant axes. In this way the threaded cap 130 may be moved to an approach position relatively close to, but safely away from, a threaded top 140 of interest. From the approach position, the linear rotary actuator 110 may perform a "soft land" operation whereby the threaded cap 130 is brought onto contact with the threaded top 140 so as not to damage the linear rotary actuator 110, tool 120, threaded cap 130, and/or threaded top 140, and also so as to establish an accurate contact location. The soft land operation also prevents the threaded cap 130 from decoupling or being dislodged from the tool 120. Additional information about the soft land operation is set forth in U.S. Pat. No. 5,952,589 entitled "Soft Landing Method for Tool Assembly" (the "'589 patent") and U.S. Publication No. 2005/0234565 entitled "Programmable Control System for Automated Actuator Operation", respectively, both of which are hereby incorporated by reference in their entireties for all purposes.

As is discussed in the '589 patent, the soft land procedure typically involves placing the threaded cap at an approach position. This approach position can be arbitrarily established in accordance with the desires of the operator, but preferably, the approach position places the threaded cap about one millimeter away from the threaded top. The approach position will generally be dependent on the characteristics of the component; namely, the approach position can be made to be closer to bottles with tight tolerances and flat surfaces without substantially increasing the risk of forceful, inadvertent contact. In any event, the threaded cap is placed at the approach position for subsequent movement along a path from the approach position onto soft contact with a predetermined threaded top. In other embodiments alternate schemes may be employed for moving the threaded cap from the approach position onto contact with the target threaded top.

Momentarily, the threaded cap may be held stationary at the approach position. Then, the forces which are acting to hold the threaded cap stationary are changed in magnitude until the inherent static friction forces that have been acting on the stationary threaded cap are overcome. When the static friction forces have been overcome, the system becomes dynamic and the threaded cap advances toward the threaded top under the influence of the resultant force.

As the threaded cap is advanced toward the threaded top, it is moved rapidly in a position mode until reaching the approach position. From the approach position, the threaded cap proceeds in a soft land mode until contact is made with the threaded top. Specifically, several control modes of operation for determining soft contact are possible. In particular, each of these control modes depends on a measurable parameter that is characteristic of the movement of the linear rotary actuator. These measurable parameters include i) the threaded cap travel position on the path toward the threaded top (i.e. a position control mode), ii) its velocity (i.e. a velocity control mode), and iii) the acceleration/deceleration of the threaded cap (i.e. torque control mode). In an alternate embodiment, none of the above mentioned measurable parameters are monitored and, instead, the threaded cap is allowed to merely advance onto soft contact with the threaded top under the influence of the resultant force (i.e. a basic mode). The position control mode of operation, velocity control mode of operation and the torque control mode of operation are described in further detail in the '589 patent.

Figure 3:
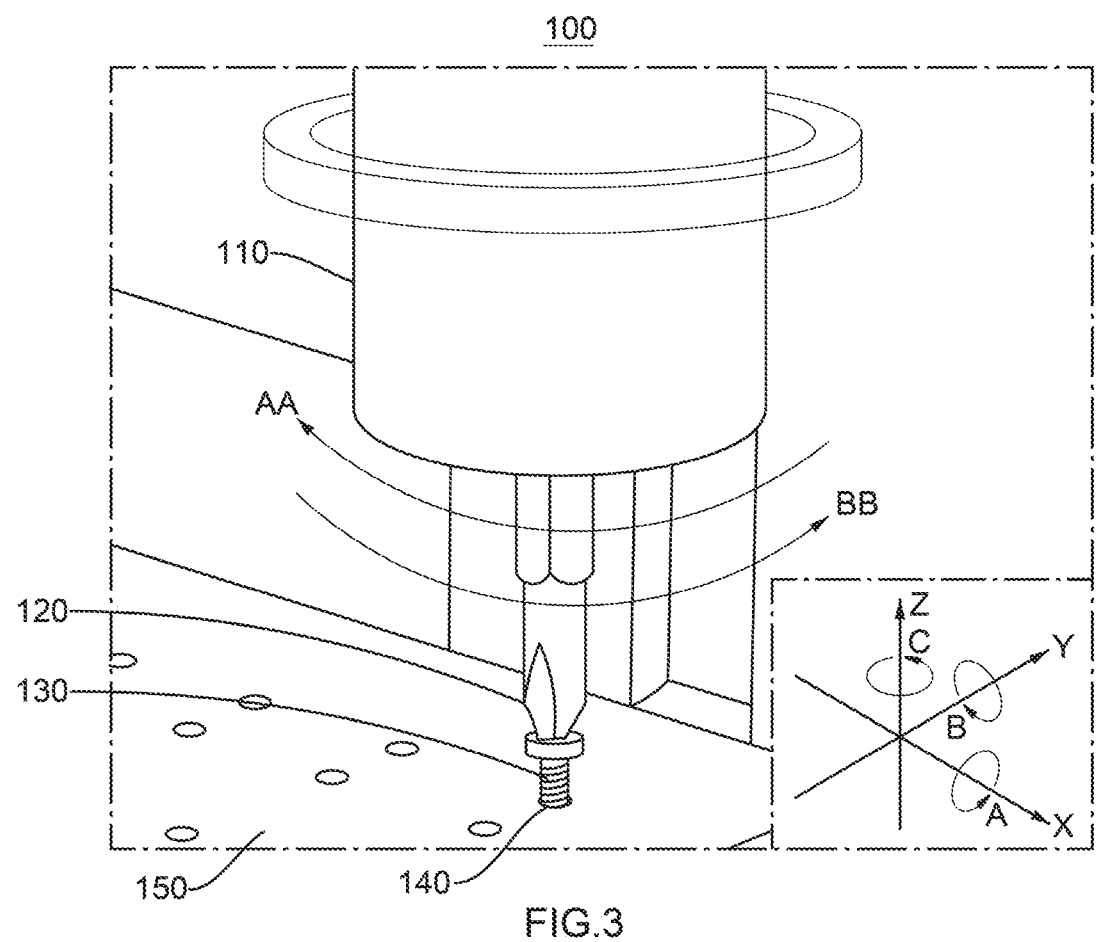
FIG. 3 shows an exemplary linear rotary actuator and a threaded cap driving onto a threaded top of a container according to an embodiment of the present invention.
Figure 4:
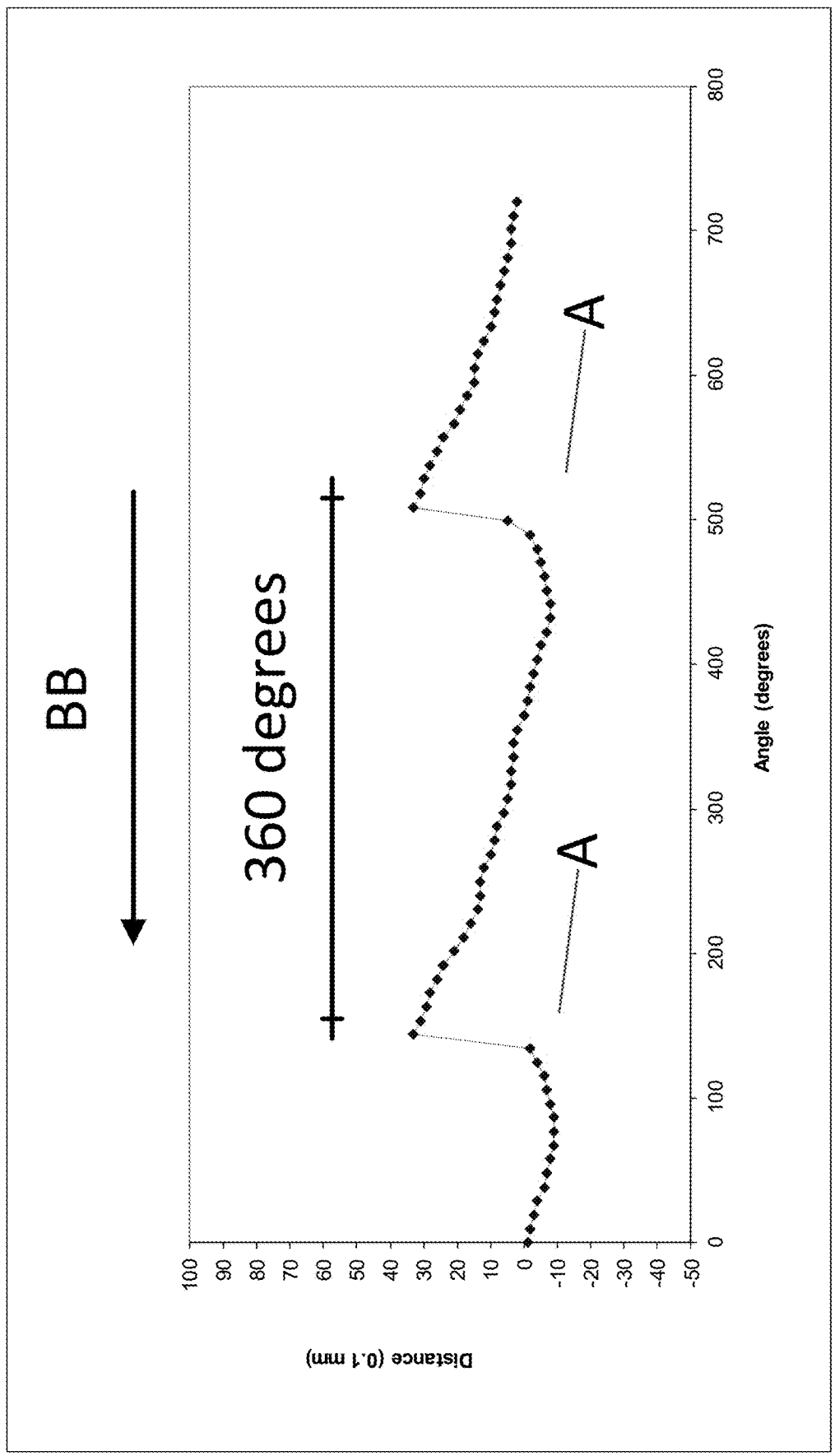
FIG. 4 shows a graph of the angle of rotation of threaded cap in contact with the top of a threaded top of a container.

As shown in FIG. 2, container 150 comprises a threaded top 140. The container 150 includes, but is not limited to, jars, bottles, tubs, jugs, cans, and other containers with a threaded top. After the threaded cap 130 soft lands in contact with threaded top 140, an end of the threaded cap's thread can be aligned with an end of the threaded top's thread. While applying a light downward pressure along the Z axis, the linear rotary actuator 110 begins the rotate in a direction BB as shown in FIG. 3. Direction BB is the reverse direction of the threads. In other words, the linear rotary actuator 110 initially rotates in the direction BB that would normally be used to remove the threaded cap 130 from the threaded top 140. Since the contact is between threaded cap 130 and the threaded top 140 is a portion of each of the respective threads, the contact is effectively between two inclined planes. Because the threaded cap 130 initially rotates in the opposite direction of the threads, the threaded cap does not engage with the threads of the threaded top 140. This means that as the threaded cap rotates in direction BB, the Z axis position of the threaded cap changes. FIG. 4 is a graph of the angle of rotation in a direction BB of threaded cap 130 in contact with the top of threaded top 140. Point A as shown in FIG. 4 is the beginning point of the threads of threaded cap 130 and the threaded top 140. At point A, the threads of the threaded cap 130 are ready to engage the threads of the threaded top 140.

Point A is determined by measuring the vertical displacement of the threaded cap 130 as the threaded cap is rotated in the direction BB while in contact with threaded top 140. As shown in FIG. 4, the vertical displacement can be measured in encoder counts and converted into millimeters or microns. After making one complete rotation of 360 degrees, the lowest point, point A, can be determined. The threaded cap 130 can continue to be rotated in direction BB to the next occurrence of point A, at which time the rotation is stopped and the threaded cap is ready to be driven the opposite direction and onto the threaded top. The location of point A is after the highest displacement of the threaded cap as it is rotated in direction BB, as shown in FIG. 4. Point A can be detected by a drop or a movement along the Z axis of the threaded cap towards the threaded top. Depending on the taper, thread size, pitch, lead, thread type, and angle, the drop or the movement along the Z axis of the threaded cap towards the threaded top may be about 3 millimeters, about 2.5 millimeters, about 2 millimeters, about 1.7 millimeters, about 1.5 millimeters, about 1.3 millimeters, about 1 millimeters, and about 0.5 millimeters to 5 millimeters, including all ranges and subranges therebetween.

Though depicted and described in terms of standard right-hand caps, the directions AA and BB apply equally to left-hand caps, except each direction would be reversed for left-handed caps. The concepts described herein also apply to other thread types including, but not limited to luer, straight, tapered, and double-start thread types.

An advantage of reversing the threaded cap 130 while contacting the threaded top 140 is the avoidance of cross threading and misdrives. Cross threading occurs when a threaded cap is misaligned with a threaded top, yet the cap is driven out of alignment onto the threaded top resulting in damage to the threads of the threaded cap and to the threaded top. Cross threading also weakens the strength of the connection and reduces the holding power of the threaded cap. Once threads are damaged from cross threading, the threaded cap or threaded top generally cannot be reused, and it may be difficult to remove the threaded cap from the threaded top. Misdrives occur when the threaded cap becomes dislodged or decoupled from the tool and becomes misaligned with the threaded top. The threaded cap must then be recoupled to the tool or a replacement threaded cap must be obtained. Sometimes the threaded cap becomes lost in the assembly line or lost inside the component due to the misdrive, and can result in a work stoppage and lost throughput while the threaded cap is retrieved.

Once the threaded cap 130 is positioned within the threaded top 140 and at point A—the ends or starting points of each of the threads, the threaded cap is ready to be rotated in direction AA by tool 120. FIG. 3 shows linear rotary actuator 110 that is being rotated in direction AA to insert or to drive the threaded cap 130 onto the threaded top 140. As the linear rotary actuator rotates in direction AA, a downward force is applied along the Z axis to insure positive engagement between the tool 120 and the threaded cap 130.

Figure 5:
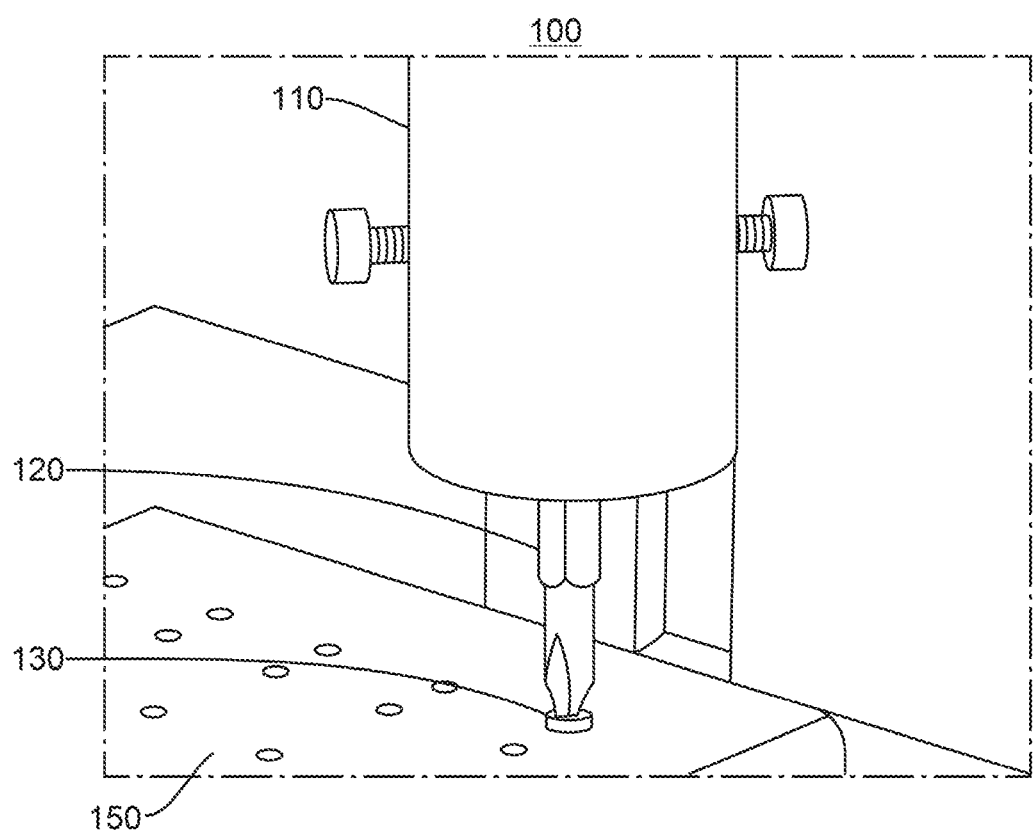
FIG. 5 shows an exemplary linear rotary actuator and a threaded cap inserted onto a threaded top of a container according to an embodiment of the present invention.

As shown in FIG. 5, the threaded cap 130 has been fully applied to the threaded top 140 of container 150. In one embodiment, the threaded cap 130 is driven from a starting position to an intermediate position at a first torque, and then driven from an intermediate position to a final position at a second torque. In this embodiment, the first torque is applied until the threaded cap stops at an intermediate position corresponding to a "snug" tightness or a "snug" applied torque. In this manner the threaded cap has stopped rotation and any play or loose fit between the threaded cap and threaded top is substantially eliminated, but the threaded cap has not been firmly rotated to a final torque specification. A second torque may be applied to the snug threaded cap to rotate from the snugged intermediate position to the final position at a final torque specification.

In one embodiment, a plurality of linear rotary actuators are arranged in series along a conveyor to tighten a plurality of threaded caps on a plurality of threaded containers. In one embodiment, a plurality of linear rotary actuators are arranged in series in fixed positions along a conveyor to tighten a plurality of threaded caps on a plurality of threaded containers. In one embodiment, a plurality of linear rotary actuators are arranged in series travel in sync with a conveyor to tighten a plurality of threaded caps on a plurality of threaded containers.

In one embodiment, a final torque is applied to a threaded cap by rotating the threaded cap in a forward direction until it reaches its final torque specification. In one embodiment, a final torque is applied to a threaded cap by initially rotating the threaded cap in a reverse direction to loosen the cap. After the threaded cap is loosened, the threaded cap is then driven in the forward direction until reaching its final torque specification. An advantage of loosening a snug threaded cap, and then immediately retightening the threaded cap to its final torque specification is that the effects of stiction are minimized. In this manner, the final torque specification is accurately achieved. In one embodiment, the final torque is verified by reversing the threaded cap and then re-torqueing the threaded cap. Another advantage is that two or more of the initial tightening torque, the reverse loosening torque, and the re-tightening torque can be compared with each other to verify the accuracy of the operation and the quality of the connection.

Figure 6:
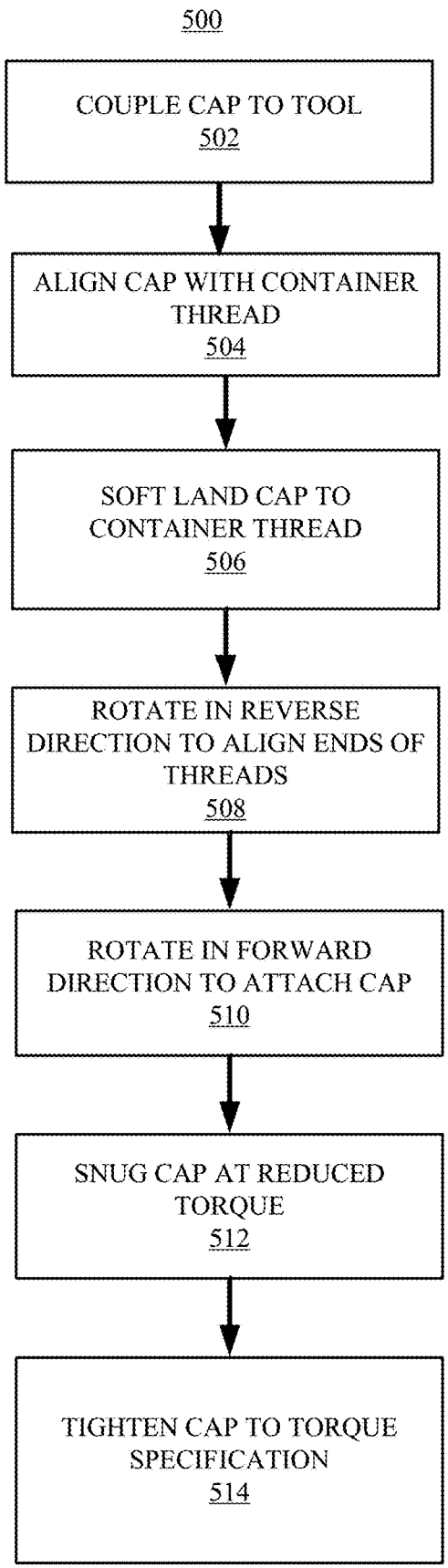
FIG. 6 is a flowchart describing exemplary operation of the linear rotary actuator apparatus for applying a threaded cap according to an embodiment of the present invention.

FIG. 6 shows a block diagram an exemplary method 500 for applying a threaded cap, according to an embodiment. A linear rotary actuator with an attached tool couples to a threaded cap in step 502. In step 504, the linear rotary actuator aligns the axis of the threaded cap with the axis of the threaded top of a container. The threaded cap and the threaded top share a common axis after the alignment is complete. The linear rotary actuator rapidly advances the threaded cap towards the threaded top until a predetermined distance away, at which point the linear rotary actuator begins a soft land procedure 506 until the threaded cap contacts the threaded top. The soft land procedure includes using a position control mode, a torque control mode, a velocity control mode, or a basic mode. In step 508, the threaded cap is rotated in a reverse direction to align an end of the threaded cap thread with an end of the threaded top thread. Once the threads are aligned, thereby avoiding cross threading and misdrives, the threaded cap is ready to be driven onto the threaded top. In step 510, the threaded cap is rotated in a forward direction to apply the threaded cap onto the threaded top. In optional step 512, the thread cap is driven onto the threaded top until snug, which is a reduced torque that retains the component and threaded cap in place. After optionally snugging the cap, the linear rotary actuator is ready to apply a final torque to the cap in step 514.

In some embodiments, the linear rotary actuator is an electrical, moving coil linear actuator configured to actuate at variable speed and includes an encoder to provide positioning feedback related to the position of the tool. In some embodiments, the linear rotary actuator is electrically coupled to controller to receive power from and to provide an output signal to that representative of position, speed, and torque. The controller processes the signal representative of position, speed, and torque and provides a control signal to linear rotary actuator to precisely adjust the position of the tool in a X, Y, Z, A, B, and C directions above the component. The controller may provide a control signal to the linear rotary actuator to position the threaded cap coupled to the tool in an approach position. From the approach position, the linear rotary actuator can actuate to move the threaded cap in a soft land mode until the threaded cap is in contact with the threaded top.

In some instances, the linear rotary actuator moves along X, Y, Z, A, B, and C axes and rotational axes. The linear rotary actuator can be positioned in a high velocity position mode until the approach position, and thereafter, the linear rotary actuator can be positioning in a soft land mode until the threaded cap contacts with the threaded top.

Advantages of the present invention include greater processes throughput and improved product quality by reducing cross threading and misdrives. Other advantages include reduce component damage including latent damage which results in premature component failures.

A controller (not shown) can control the movements of the linear rotary actuator. For example, the controller can be a servo controller that can operate a moving coil actuator. In some configurations, the controller can be, for example, a Galil DMC31012 controller with built-in amplifier and a 16 bit analog output.

In accordance with programmed instructions, typically in the form of software, the controller can generate control signals and output such control signals to cause movement of the tool about one or more axes. In one embodiment the controller is programmed to control the linear rotary actuator depending on the application, i.e., depending on the threaded cap to be applied. For example, the controller includes software that is specifically configured to cause the desired actuator movement and measurement for the specific component to be inspected. Typically, a computer (not shown) is coupled to the controller to generate and transmit software (code representing a set of instructions to be executed) generated in a programming language to the controller for the specific application. Such software, once running on the controller, will instruct tool movements for that specific application.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Figure 7:
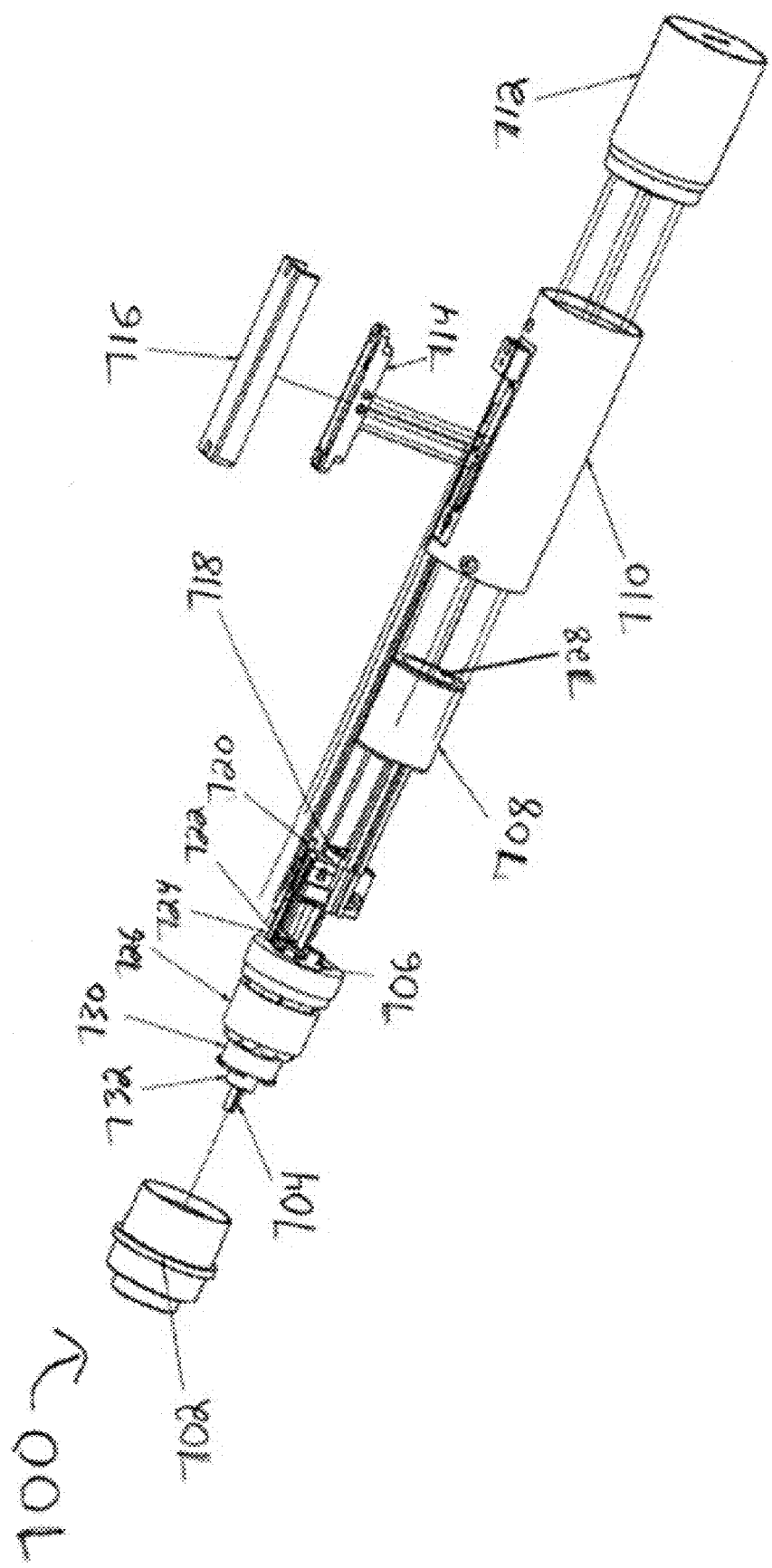
FIG. 7 and FIG. 8 are exploded views of the exemplary linear actuator having a rotary motor.
Figure 8:
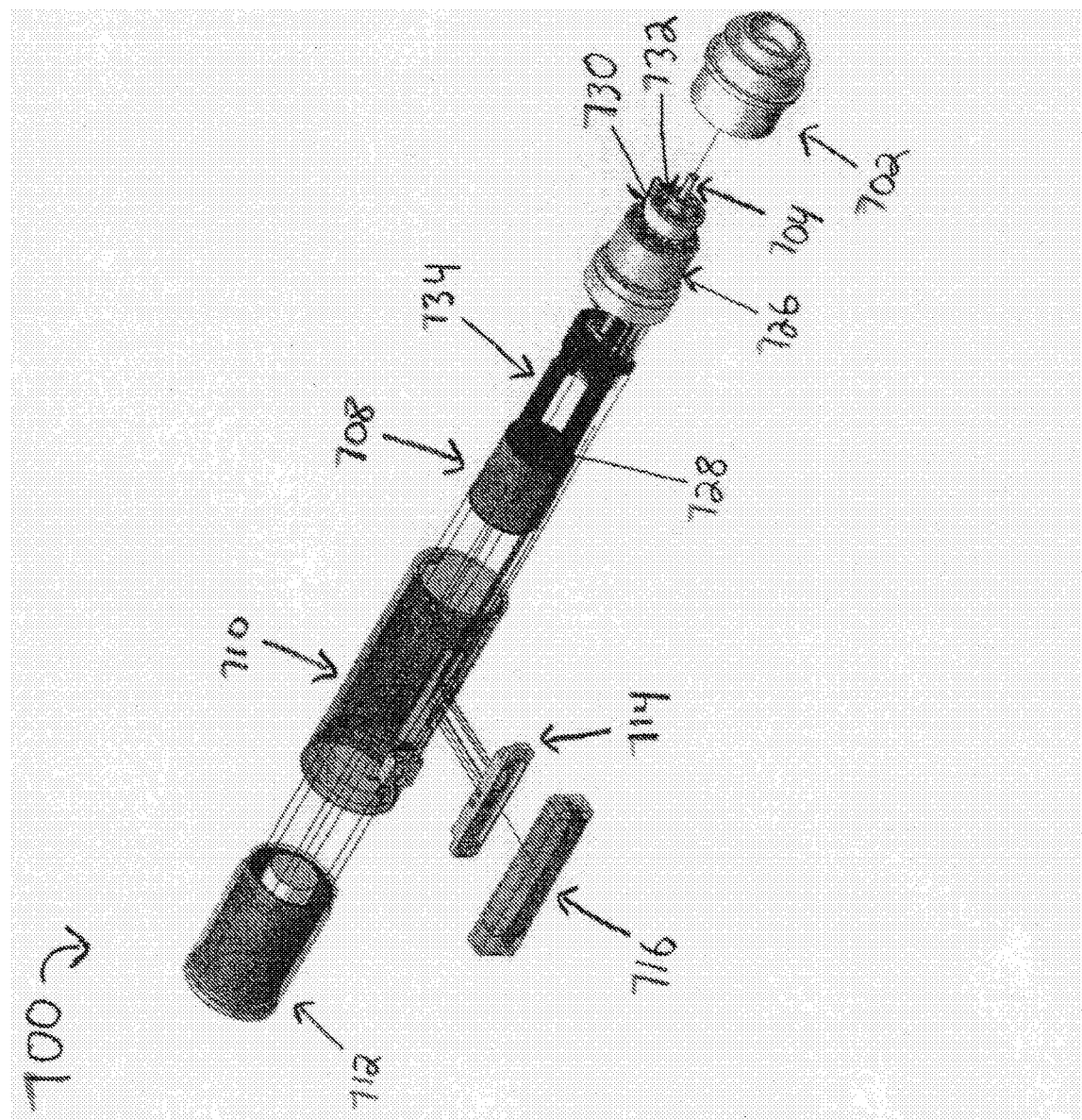

As noted above, the linear rotary actuator 110 can be any actuator based device, such as a pneumatic, hydraulic or electrical actuator. FIGS. 7-9 illustratively represent an exemplary linear rotary actuator 700 capable of being utilized as the rotary actuator 710.

Attention is now directed to FIG. 7 and FIG. 8, which are exploded views of the exemplary linear actuator 700 having a rotary motor. As shown by these figures, the linear actuator 700 includes a rotary motor housing 702, a spline shaft 704, a rotary encoder 706, a coil 708, a main housing 710, a magnet housing 712, a linear encoder 714, an encoder housing 716, a rotary bearing 178, a rotational lock 720, a rotary scale 722, a linear scale 724, a stator 726, a bobbin 728, a rotor 730, a spline bearing 732, and a piston assembly 734.

In some embodiments, all or a portion of the manufactured parts can be machined on a CNC lathe such as the Hardinge model RS51MSY or other lathe that has the ability to machine both ends of a component (e.g., via sub-spindle transfer) as well as the ability to do mill work. According to some embodiments, each part can be made in a single operation on the lathe, thereby reducing and/or eliminating the need for secondary operations. These secondary operations present additional costs and may also reduce quality by increasing dimensional variation.

In some embodiments, various components of the linear actuator 700 may be manufactured from aluminum or steel bars. Note, however, that a myriad of other materials may be used according to embodiments of the present invention.

As best shown in FIG. 8, the piston assembly 734 may include at least one bobbin 728 for supporting an electrically conductive medium such as coil 708. During operation, current is introduced through the coil 708 thereby creating a magnetic field having a direction that depends upon the direction that the current is flowing through the coil 708.

In some embodiments, the piston assembly 734 and the bobbin 728 may be formed as a single, unitary piece. A single, unitary piece can make construction of the actuator 700 less complicated and quicker to assemble because there are fewer pieces. Moreover, using a single, unitary piece can be more cost effective, as a single piece can be less costly to produce than multiple separate pieces. A single, unitary piece can also weigh less than a multi-piece piston-bobbin assembly since such an assembly may require additional fasteners or hardware to attach the various components together.

The magnet housing 712 may include one or more magnets (for example, substantially cylindrical magnets or circular magnet segments) which may be easily fastened inside the magnet housing 712 during manufacturing with various adhesives or screws. Such magnets are adapted to magnetically interface with the piston assembly 734 when a magnetic field is present. Hence, by repeatedly alternating the direction that current is flowing through the coil 708, a linear force may be repeatedly imparted upon the piston assembly 708.

Note that while FIG. 7 and FIG. 8 each depict a single-coil actuator 700, in other embodiments, the piston assembly 734 may include multiple coils 708 supported by separate bobbins 728 of the same piston assembly 734, as well as a magnet housing 712 containing a series of alternately magnetized magnets (e.g., NS, SN, NS, etc.). Persons skilled in the art will recognize that the magnet housing 712 and piston assembly 734 for such a multi-pole configuration can be implemented using standard machining processes.

In some embodiments, stroke variation and encoder resolution may be easily adjusted, thereby reducing costs associated with reconfiguring and/or replacing the actuator. Where stroke is a function of three assemblies (the magnet housing 712, the piston assembly 734, and the main housing 710) a replaceable magnet housing 712 may be used to increase the length of the stroke, yet without requiring replacement of more expensive components that are serviceable in all stroke variations (e.g., the piston assembly 734 and the main housing 710). For example, the magnet housing 712 may be replaced with a more elongated magnet housing 712, thereby enabling a longer actuator stroke.

As best shown in FIG. 8, the side of the piston assembly 734 opposite the coil 708 includes an interface for securing a spline shaft 704. Such a spline shaft 704 may include, for example, a metallic shaft having one or more slits or grooves 705 (see, e.g., FIG. 9C) running along its length.

One or more spline bearings 732 (e.g., annular bearings) having protrusions corresponding to the grooves 705 of the spline shaft 704 are adapted to receive the spline shaft and thereby prevent the shaft 704 from rotating relative to the spline bearings 732. The spline bearings 732 may also serve to reduce the level of friction associated with linear movement of the shaft 704 relative to the spline bearings 732. In order to accomplish this, the spline bearings 732 may include a set of balls, globules, or other such spherical bodies for circulating around a track within each respective bearing 732 as the shaft 704 is driven through each bearing 732. In this manner, the spline bearings 732 may serve as a linear guide to the spline shaft 704 so as to prevent unwanted rotation of the shaft 704 and to further enable linear movement of the shaft 704 with a reduced amount of associated friction. In one embodiment, the spline bearing 732 may include a linear guide assembly manufactured by IKO Inc. (# MAG8CITHS2/N). Note, however, that a myriad of other structures/guide assemblies may be utilized according to the scope of the present invention.

In some embodiments, the central axis of the bobbin 728 supporting coil 708 is approximately collinear with the spline shaft 704. This design can help reduce or eliminate an unwanted moment, or a lateral force which may otherwise translate to the piston assembly 734 if the coil were positioned to one side of the piston assembly 734. Such a design can improve force repeatability which is particularly useful in precise force applications such as small electronic parts assembly and precision glass scoring.

In some embodiments, the piston assembly 734 may include a linear scale 724 for indicating linear positional feedback to a linear encoder 714. As shown in FIG. 7 and FIG. 8, the linear encoder 714 may be situated within an encoder housing 716 which is itself disposed within a cutout of the main housing 710. The encoder housing 716 can be fastened to the main housing 710 of the actuator 700 using screws, for example. The linear encoder 714 may thus remain fixed within the main housing 710 as the piston assembly 734 is repeatedly actuated.

Figure 9A:
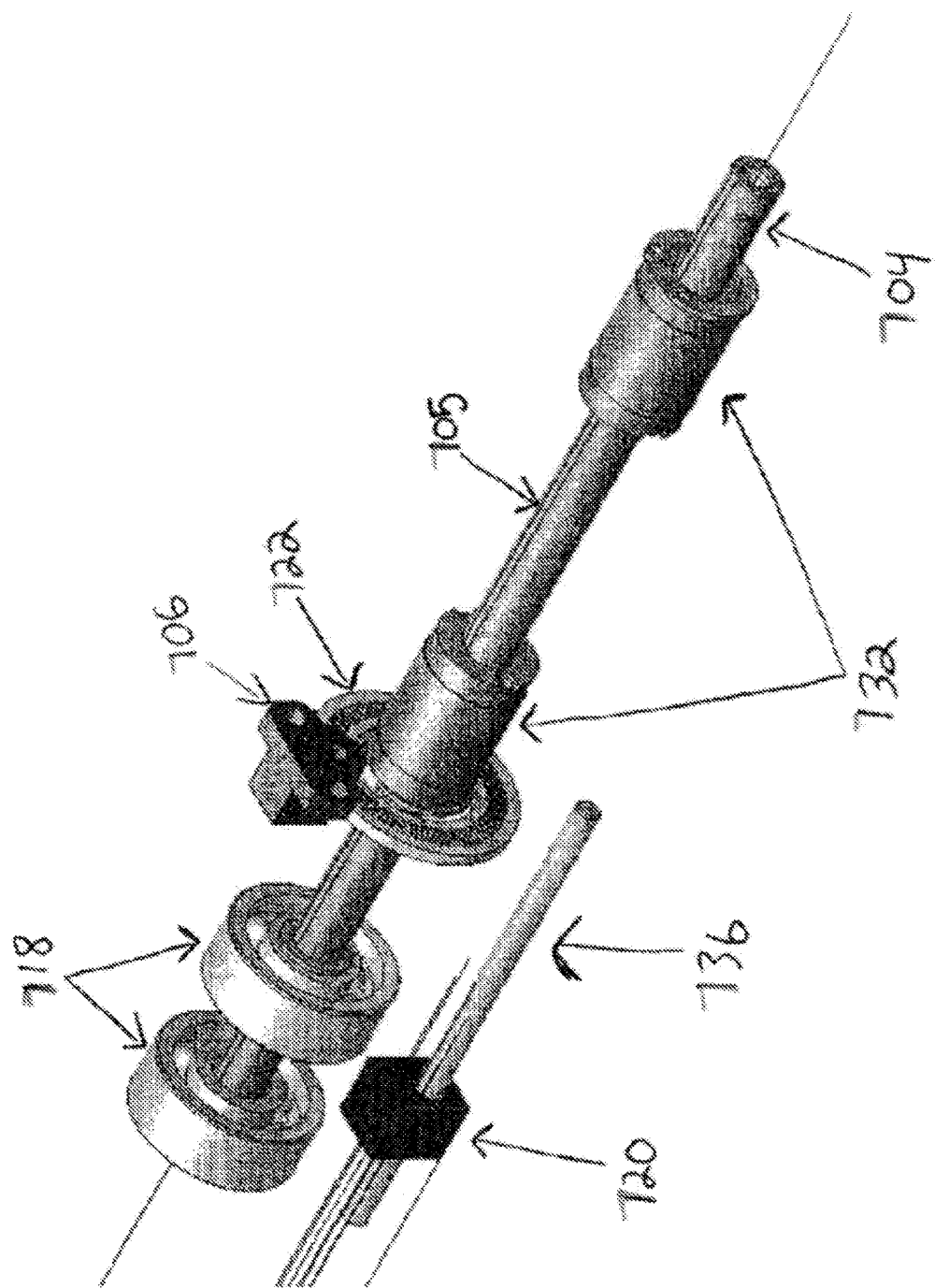
FIGS. 9A-9D are various cut-away views of an exemplary linear actuator having a rotary motor according to one embodiment.
Figure 9B:
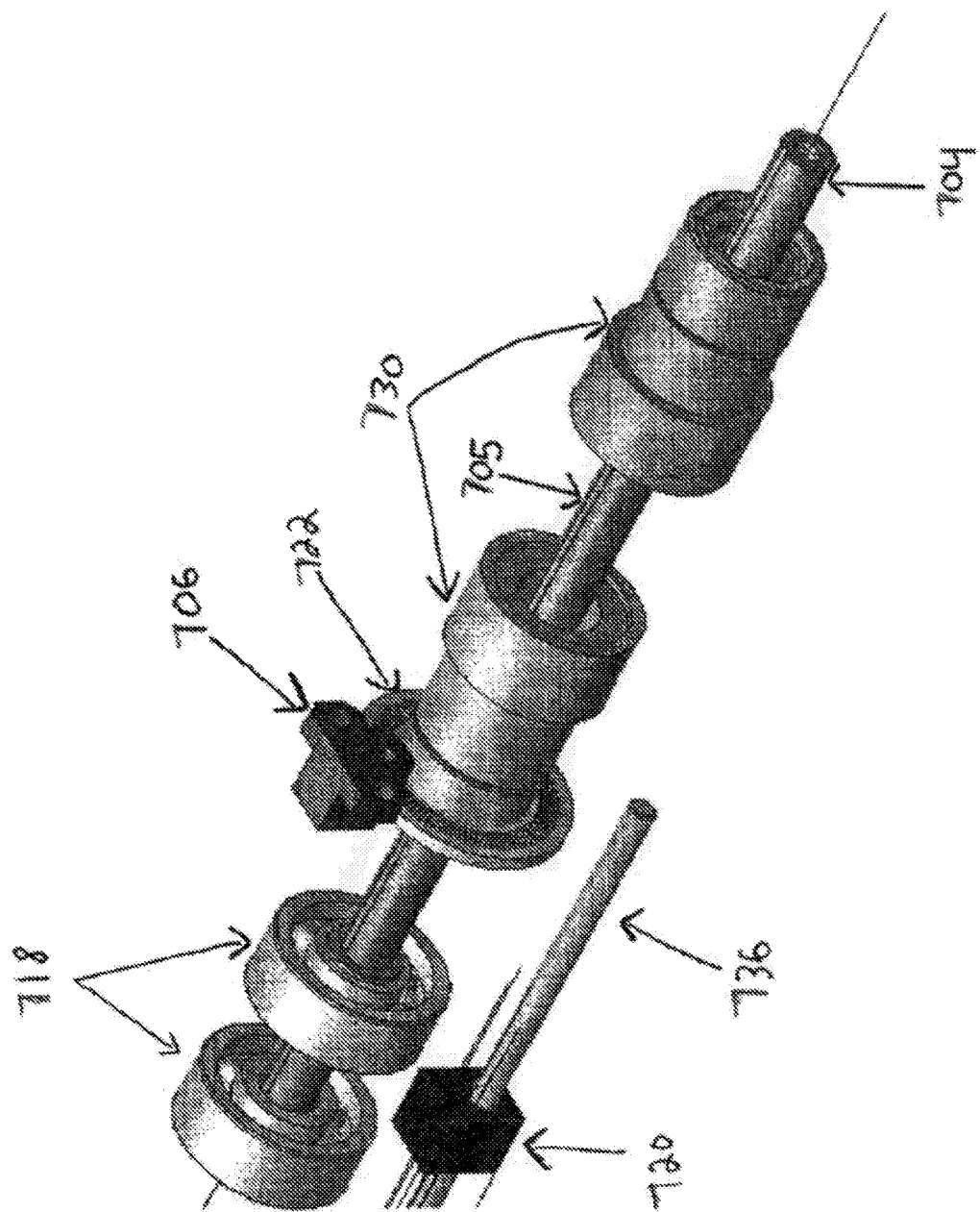
Figure 9C:
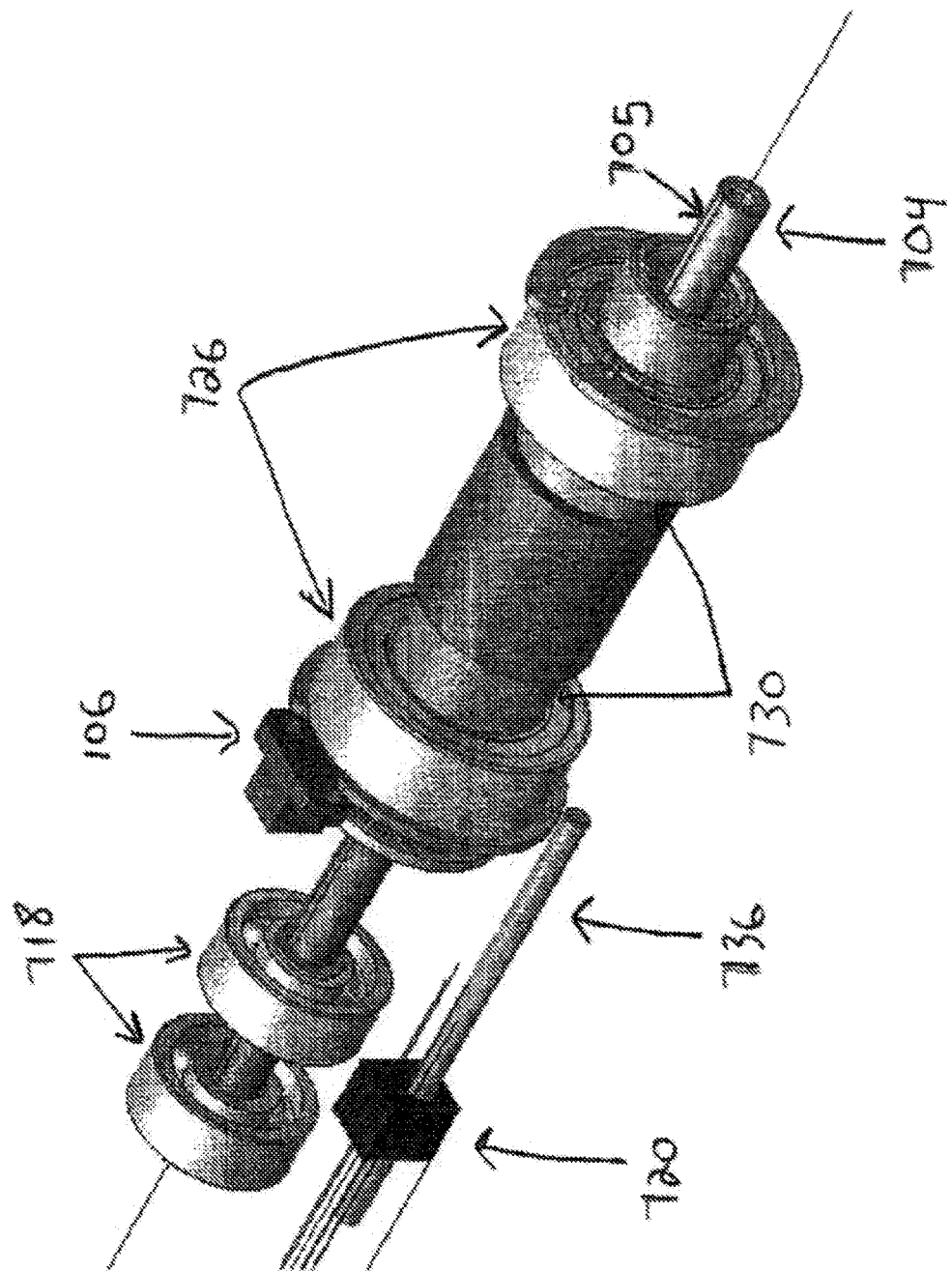
Figure 9D:
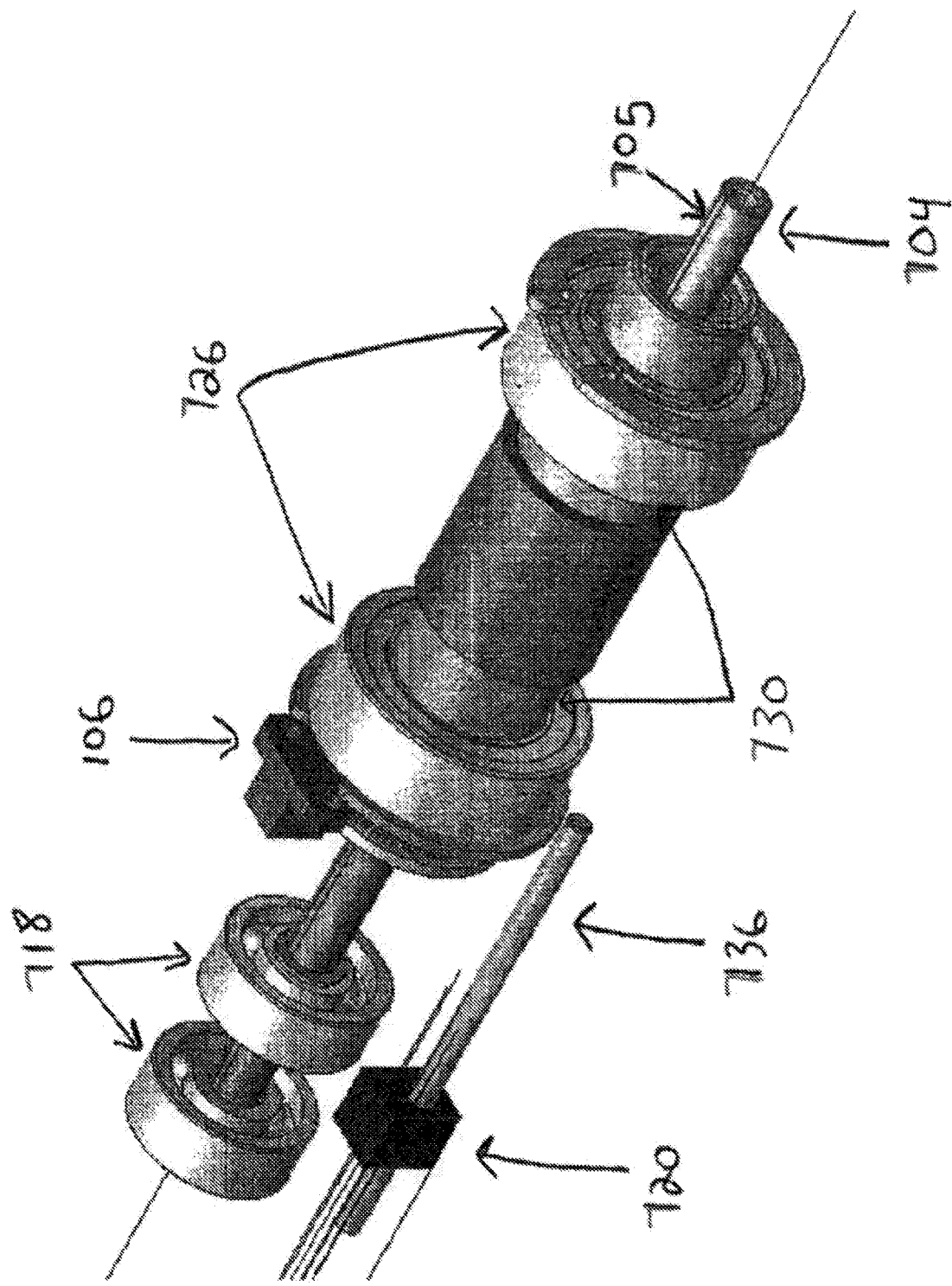

As best shown by FIG. 9D, the linear scale 724 may include a series of stripes or markings running along the length of the scale. When the piston assembly 734 is actuated, the linear encoder 714 (e.g., an optical reader) may count the number of stripes or markings read in order to determine the current linear position of the piston assembly 734. In some embodiments, recorded positional data may then be transmitted to a remote device for monitoring purposes. In some embodiments, a user can input one or more values to a remote device (such as a connected computer) in order to designate an amount of linear movement desired for a particular task. These values can then be transmitted to a controller (not shown) in electrical communication with the linear encoder 714 so that linear movement of the piston assembly can be adjusted according to the values specified.

In order to enable the linear actuator 700 to perform tasks requiring rotation, a rotational lock 720, a rotary bearing 718, and a rotary motor including stator 726 and rotor 730 may be utilized in conjunction with the various components mentioned above for enabling linear operation. These components are best described and illustrated with reference to the following figures.

FIGS. 9A-9D are various cut-away views of an exemplary linear actuator having a rotary motor according to one embodiment. According to the design of the embodiments depicted in these figures, the rotary motor remains fixed irrespective of the linear position of the shaft 704, thereby enabling the shaft 704 to move in linear direction without being substantially encumbered by the mass of the rotary motor. A smaller force is thereby necessary to drive the linear actuator 700 at a designated acceleration. Similarly, a greater acceleration is attainable for a specified amount of force.

Referring first to FIG. 9A, the first cut-away view depicts a spline shaft 704 with one or more grooves 705 running along its length, one or more spline bearings 732 for guiding the spline shaft 704 upon being actuated in a linear direction, a rotary scale 722 for indicating rotational feedback to a rotary encoder 706, one or more rotary bearings 718 for enabling rotation of the shaft 704 relative to the piston assembly 734 (not shown), and a rotational lock 720 for preventing the piston assembly from rotating as the shaft 704 is rotated.

As discussed above with reference to FIGS. 7 and 8, the one or more spline bearings 732 are adapted to prevent the shaft 704 from rotating relative to the spline bearings 732. Thus, when the spline bearings 732 remain fixed, movement of the shaft 704 is linearly guided by the spline bearings 732 along the grooves 704 of the spline shaft 704, thereby preventing rotation.

However, even though the spline shaft 704 may not rotate relative to the spline bearings 732, the spline shaft 704 and spline bearings 732 may rotate in tandem relative to the piston assembly 734 (not shown). One or more rotary bearings 718 positioned at the proximal end of the spline shaft 704 may be used to secure the shaft 704 to the piston assembly 734, yet also enable the shaft 704 and spline bearings 732 to rotate relative to the piston assembly 734.

The piston assembly 734 may include a rotational lock 720 for preventing the piston assembly 734 from rotating during operation. The rotational lock 720 may include one or more apertures for receiving a locking pin 736, spline shaft, or other such locking mechanism while remains fixed while the shaft 704 is rotated. In some embodiments, the rotational lock 720 may be formed directly within the piston assembly 734, thereby reducing the number of parts necessary for assembly of the linear actuator 700. In some embodiments, the rotational lock 720 may include a spline bearing 732 for reducing the amount of friction between the rotational lock 720 and the locking pin 736 as the piston assembly 734 is actuated and the rotational lock 720 slides upon the spline shaft or locking pin 736.

Optionally, the linear actuator 700 may include a rotary scale 722 for indicating rotational feedback to a rotary encoder 706. As best shown in FIG. 9A and FIG. 9B, the rotary scale 722 may include a series of stripes or markings oriented radially across the surface of the rotary scale 722. When the spline bearings 732 are rotated, the rotary encoder 706 (e.g., an optical reader) may count the number of stripes or markings it has read in order to determine how far the spline shaft 704 has rotated. Rotational data recorded in this manner may then be transmitted to a remote device for monitoring purposes.

According to some embodiments, a user can input one or more parameters to a remote device (such as a connected computer) in order to designate an amount of rotational movement desired for a particular task. These values can then be transmitted to a controller (not shown) in electrical communication with the rotary encoder 706 so that rotational movement of the spline shaft 704 can be adjusted according to the values specified.

Referring next to FIG. 9B, the shaft 704 of the actuator 700 is presented with one or more rotors 730 for rotatably engaging the spline bearings 734. In some embodiments, the one or more rotors 730 include rotary bearings each containing at least one magnet (e.g., an annularly-shaped magnet). In some embodiments, the one or more rotors 730 are positioned around the spline bearings 734 such that rotation of a rotor 730 causes rotation of the spline bearings 732, which in turn causes rotation of the shaft 704 of the actuator 700.

Turning next to FIG. 9C, the shaft 704 of the actuator 700 is now depicted with stators 726 for rotatably actuating the corresponding rotors 730. Each stator 726 may include an electrically conductive medium, such as set of coils (not shown) for electric current to run through. The magnetic field generated when current running through the coils magnetically actuates the rotors 730, thereby causing rotation of the spline bearings 734 and hence the shaft 704. Thus, the shaft 704 of the actuator 700 can repeatedly rotate in clockwise and counter-clockwise directions by repeatedly switching the current flow to the coils of the stators 726.

FIG. 9D illustrates the shaft 704 of the actuator 700 as secured to the piston assembly 734 via the rotary bearings 718. As shown in this figure, the piston assembly 734 includes a linear scale 724 for indicating the linear position of the piston assembly 734 to a linear encoder 714 (shown in FIG. 7 and FIG. 8). Since the linear actuator 700 can determine both the linear position of the piston assembly 734 (e.g., via the linear scale 724 and linear encoder 714) as well as the rotational of the shaft 704 (e.g., via the rotary scale 722 and the rotary encoder 706), positional data may be used to monitor the operation of the actuator 700. In some embodiments, the linear encoder 714 and/or the rotary encoder 706 are adapted to control operation of the linear actuator 700 based upon one or more designated parameters. These parameters may include, without limitation, linear force, linear speed, linear position, linear acceleration, rotational force, rotational speed, rotational position, and rotational acceleration.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above. Although various modules in the different devices are shown to be located in the processors of the device, they can also be located/stored in the memory of the device (e.g., software modules) and can be accessed and executed by the processors. Accordingly, the specification is intended to embrace all such modifications and variations of the disclosed embodiments that fall within the spirit and scope of the appended claims.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method for applying a threaded cap onto a threaded top of a container using an actuator configured with a tool, the method comprising:
    coupling the threaded cap to the tool, the threaded cap having a clockwise thread about a threaded cap axis;
    aligning the threaded cap axis with a threaded top axis of the threaded top;
    linearly actuating the actuator to move the threaded cap along the threaded top axis into contact with the threaded top so as to establish a contact location;
    rotatively actuating the actuator in a counter-clockwise direction to align a thread end of the threaded cap with a thread end of the threaded top;
    rotatively actuating the actuator in a clockwise direction to drive the threaded cap onto the threaded tops;
    measuring a vertical displacement of the threaded cap from the contact location during rotation of the threaded cap in the counter-clockwise direction while in contact with the threaded top; and
    initiating the rotatively actuating the actuator in the clockwise direction based upon a measurement of the vertical displacement.

2. The method of claim 1 wherein the linearly actuating the actuator includes:
    linearly actuating the actuator to move the threaded cap along the threaded top axis into an approach position;
    linearly actuating the actuator to move the threaded cap from the approach position into contact with the threaded top using a soft land procedure.

3. The method of claim 2, wherein the soft land procedure uses a position control mode.

4. The method of claim 2, wherein the soft land procedure uses a torque control mode.

5. The method of claim 2, wherein the soft land procedure uses a velocity control mode.

6. The method of claim 2, wherein the soft land procedure uses a basic control mode.

7. The method of claim 1, further comprising applying a reduced torque to the threaded cap to snug the threaded cap on the threaded top.

8. The method of claim 7, further comprising:
applying a final torque to the threaded cap to achieve a final torque specification for the threaded cap on the threaded top by rotatively actuating the actuator in the clockwise direction.

9. The method of claim 7, further comprising:
rotatively actuating the actuator in a counter-clockwise direction to loosen the threaded cap prior to the applying the final torque.

10. The method of claim 1, wherein the actuator is a linear rotary actuator.

11. The method of claim 1 further including determining, based upon a feedback signal from a torque sensor associated with the actuator, that at least one of the threaded cap and the threaded top are impaired.

12. The method of claim 11 wherein the feedback signal indicates a minimum torque condition exists after the threaded cap has been rotated a required number of turns.

13. The method of claim 1, wherein the measuring the vertical displacement of the threaded cap occurs after the threaded cap has made one complete rotation of 360 degrees in the counter-clockwise direction.

* * * * *